(12) United States Patent
Bush et al.

(10) Patent No.: US 9,171,308 B2
(45) Date of Patent: Oct. 27, 2015

(54) METHOD AND SYSTEM FOR ACCOUNT MANAGEMENT

(75) Inventors: Steve Bush, Redmond, WA (US); Edward Jung, Bellevue, WA (US); Holly Knight, Woodinville, WA (US)

(73) Assignee: OpenDesign, Inc., Bellevue, WA (US)

( * ) Notice: Subject to any disclaimer, the term of this patent is extended or adjusted under 35 U.S.C. 154(b) by 2323 days.

(21) Appl. No.: 11/541,430

(22) Filed: Sep. 28, 2006

(65) Prior Publication Data

US 2007/0078785 A1    Apr. 5, 2007

Related U.S. Application Data

(63) Continuation of application No. 09/747,307, filed on Dec. 22, 2000, now abandoned.

(60) Provisional application No. 60/249,412, filed on Nov. 16, 2000.

(51) Int. Cl.
| | | |
|---|---|---|
| *G06Q 30/00* | (2012.01) | |
| *G06Q 30/02* | (2012.01) | |
| *G06Q 20/38* | (2012.01) | |
| *G06Q 20/40* | (2012.01) | |

(52) U.S. Cl.
CPC ............ *G06Q 30/02* (2013.01); *G06Q 20/3821* (2013.01); *G06Q 20/4012* (2013.01)

(58) Field of Classification Search
USPC ..................................................... 705/50–80
See application file for complete search history.

(56) References Cited

U.S. PATENT DOCUMENTS

| | | | |
|---|---|---|---|
| 5,235,642 A | 8/1993 | Wobber et al. | |
| 5,534,855 A | 7/1996 | Shockley et al. | |
| 5,768,519 A | 6/1998 | Swift et al. | |
| 5,774,551 A | 6/1998 | Wu et al. | |
| 5,864,830 A * | 1/1999 | Armetta et al. | 705/41 |
| 5,950,174 A * | 9/1999 | Brendzel | 705/34 |
| 6,032,134 A * | 2/2000 | Weissman | 705/40 |
| 6,032,135 A * | 2/2000 | Molano et al. | 705/41 |
| 6,035,404 A | 3/2000 | Zhao | |
| 6,044,465 A | 3/2000 | Dutcher et al. | |
| 6,105,009 A * | 8/2000 | Cuervo | 705/43 |
| 6,144,959 A | 11/2000 | Anderson et al. | |
| 6,185,545 B1 * | 2/2001 | Resnick et al. | 705/40 |
| 6,193,155 B1 * | 2/2001 | Walker et al. | 235/381 |

(Continued)

OTHER PUBLICATIONS

European Official Commuication—Examiner's Report for European Patent Application No. 01991263.3, Applicant: Opendesign, Inc., mailed May 27, 2010, 8 pages.

*Primary Examiner* — John Hayes
*Assistant Examiner* — John M Winter
(74) *Attorney, Agent, or Firm* — Perkins Coie LLP

(57) ABSTRACT

A method and system for managing accounts that control access to resources of different providers. The account management system allows providers to use a common logon procedure through an account management server. The account management system dynamically creates accounts when users request to access resources. To access to a resource, a user provides their credentials (e.g., user identifier and password) through a certain location (e.g., client computer) and identifies the resource (e.g., application). The account management system determines whether an account has already been created for those credentials. If not, the account management system authenticates the user, creates a new account for those credentials (i.e., registration), and associates the identified resource with the account.

25 Claims, 12 Drawing Sheets

(56) References Cited

U.S. PATENT DOCUMENTS

| | | | |
|---|---|---|---|
| 6,266,653 B1* | 7/2001 | Shiobara et al. | 705/41 |
| 6,282,523 B1* | 8/2001 | Tedesco et al. | 705/45 |
| 6,315,196 B1* | 11/2001 | Bachman | 235/380 |
| 6,330,544 B1* | 12/2001 | Walker et al. | 705/14.36 |
| 6,343,279 B1* | 1/2002 | Bissonette et al. | 705/41 |
| 6,363,361 B1* | 3/2002 | Lundberg | 705/40 |
| 6,393,411 B1* | 5/2002 | Bishop et al. | 705/44 |
| 6,478,976 B1* | 11/2002 | Lepert et al. | 216/18 |
| 6,578,761 B1* | 6/2003 | Spector | 235/380 |
| 6,609,113 B1* | 8/2003 | O'Leary et al. | 705/39 |
| 6,615,189 B1* | 9/2003 | Phillips et al. | 705/41 |
| 6,615,190 B1* | 9/2003 | Slater | 705/41 |
| 6,631,849 B2* | 10/2003 | Blossom | 235/492 |
| 6,636,833 B1* | 10/2003 | Flitcroft et al. | 705/1 |
| 6,704,714 B1* | 3/2004 | O'Leary et al. | 705/39 |
| 6,769,605 B1* | 8/2004 | Magness | 235/379 |
| 6,796,497 B2* | 9/2004 | Benkert et al. | 235/380 |
| 6,805,287 B2* | 10/2004 | Bishop et al. | 235/379 |
| 6,865,547 B1* | 3/2005 | Brake et al. | 705/41 |
| 6,867,789 B1* | 3/2005 | Allen et al. | 715/744 |
| 6,879,965 B2* | 4/2005 | Fung et al. | 705/39 |
| 6,892,187 B2* | 5/2005 | Phillips et al. | 705/41 |
| 6,915,268 B2* | 7/2005 | Riggs et al. | 705/7 |
| 6,915,277 B1* | 7/2005 | Manchester et al. | 705/39 |
| 6,941,279 B1* | 9/2005 | Sullivan | 705/35 |
| 6,945,453 B1* | 9/2005 | Schwarz, Jr. | 235/375 |
| 7,050,996 B1* | 5/2006 | Blagg et al. | 705/30 |
| 2001/0049655 A1* | 12/2001 | Bellosguardo | 705/39 |
| 2001/0054155 A1 | 12/2001 | Hagan et al. | |
| 2002/0049655 A1 | 4/2002 | Bennett et al. | |
| 2002/0049806 A1 | 4/2002 | Gatz et al. | |
| 2002/0055909 A1 | 5/2002 | Fung et al. | |
| 2002/0069122 A1 | 6/2002 | Yun et al. | |
| 2002/0138728 A1 | 9/2002 | Parfenov et al. | |
| 2003/0004876 A1* | 1/2003 | Jacobson | 705/41 |
| 2003/0115463 A1 | 6/2003 | Wheeler et al. | |
| 2003/0197058 A1* | 10/2003 | Benkert et al. | 235/380 |
| 2003/0205616 A1* | 11/2003 | Graves et al. | 235/379 |
| 2004/0039694 A1* | 2/2004 | Dunn et al. | 705/39 |
| 2004/0045031 A1 | 3/2004 | Gautier | |
| 2004/0143527 A1* | 7/2004 | Benkert et al. | 705/35 |

* cited by examiner

Fig. 1A

- user ID — 101
- password — 102
- Existing user log on — 103
- New user log on — 104

Fig. 1B

- temporary password — 111
- new password — 112
- confirm password — 113
- hint — 114
- Continue — 115

Fig. 1C

Other accounts are associated with this computer, select association:

- Last name, first name — 121
- Last name, first name — 122
- Not common account — 123

Continue — 124

Application Table 303

| App ID | Reference |
|---|---|
| 01 | |
| 02 | |
| 03 | |
| 04 | |

Account Table 302

| Account ID | App ID | Node ID |
|---|---|---|
| A1 | 01,02,03 | Home<br>Work 1 |
| A2 | 01 | Home |
| A3 | 04 | Work 2 |

Connected Node Table 305

| Node ID | Node Address |
|---|---|
| Home | |

Registered Node Table 301

| Node ID | Account ID |
|---|---|
| Home | A1, A2 |
| Work 1 | A1 |
| Work 2 | A3 |

User Table 304

| User ID | Password | Account 1 |
|---|---|---|
| U1 | | A1 |
| U2 | | A2 |
| U3 | | A3 |

*Fig. 3*

Application Launch

Connect Node (includes Registration)

Register User

Process Logon Response

Register Node (new node)

Connect Node (existing node)

Disconnect Node

Process Registration Request
(new user)

Process Logon Request
(established user)

METHOD AND SYSTEM FOR ACCOUNT MANAGEMENT

CROSS REFERENCE TO RELATED APPLICATION(S)

This is a continuation application of U.S. application Ser. No. 09/747,307 filed on Dec. 22, 2000 now abandoned, which claims the benefit of U.S. Provisional Patent Application No. 60/249,412 filed on Nov. 16, 2000.

TECHNICAL FIELD

The described technology relates generally to management of accounts; particularly, accounts for accessing computer resources from various nodes.

BACKGROUND

Techniques for accessing computer resources (e.g., application programs and computer data) require that the accessing user be authorized to access the computer resource. The authorization is typically verified using a logon procedure in which a user supplies their credentials (e.g., user identifier and password) to the system that controls access to the computer resource. When the system receives the credentials, it determines whether the user is authorized to access the resource (e.g., by checking capabilities associated with the user identifier). If so, then the system allows the user to access the computer resource. For example, a database program may require a user to supply their user identifier and password before accessing (e.g., reading and writing) the data in the database.

Such techniques for accessing computer resources are well adapted to environments in which the computer resources (e.g., data in a database) are provided by a single source. For example, a news service may require a user to logon before accessing any news stories during that logon session. The news service may then bill the user on a monthly basis for all the news stories accessed during the month. Each provider of computer resources typically develops their own logon procedures. A problem with such development is that each provider duplicates the efforts of other providers when developing their own logon procedures. Another problem with such development is that each provider may use different types of logon procedures which tends to confuse users. For example, one provider may require a password to be at least 8 characters while another provider may require that passwords be 5 to 7 characters. Thus, a user who accesses the computer resources of both providers needs to remember different passwords. Even if different providers were to use the same logon procedures, a problem would still exist in that a user would receive separate bills from each provider. This problem may not be significant if a user uses the computer resources of only a few providers, but it is significant when a user (e.g., an Internet user) accesses the computer resources of many different providers (e.g., different news organizations and associations).

These problems could be solved if a procedure was provided by a logon organization that is not related to providers. For example, a user would logon through a logon organization with a single set of credentials and then access the computer resources for different providers. Providers, however, typically find it undesirable to have their logon procedures provided by an unrelated source for several reasons. First, providers prefer to have the displays associated with the logon of their users to be integrated with the look and feel of the user interface provided by the developer. Second, providers may prefer to have provider accounts used when accessing the providers' services and resources. It would be desirable to have a technique that would combine the advantages of the logon organization to avoid these difficulties, and yet enable providers to use established accounts and provider-supplied logon elements.

BRIEF DESCRIPTION OF DRAWINGS

FIG. 1A illustrates a display page for entry of the user identifier.

FIG. 1B illustrates a display page through which a user enters their temporary password and new password.

FIG. 1C illustrates a display page for identifying common accounts.

FIG. 3 is a block diagram illustrating the tables of the accounts database in one embodiment.

DETAILED DESCRIPTION

Figure 2:
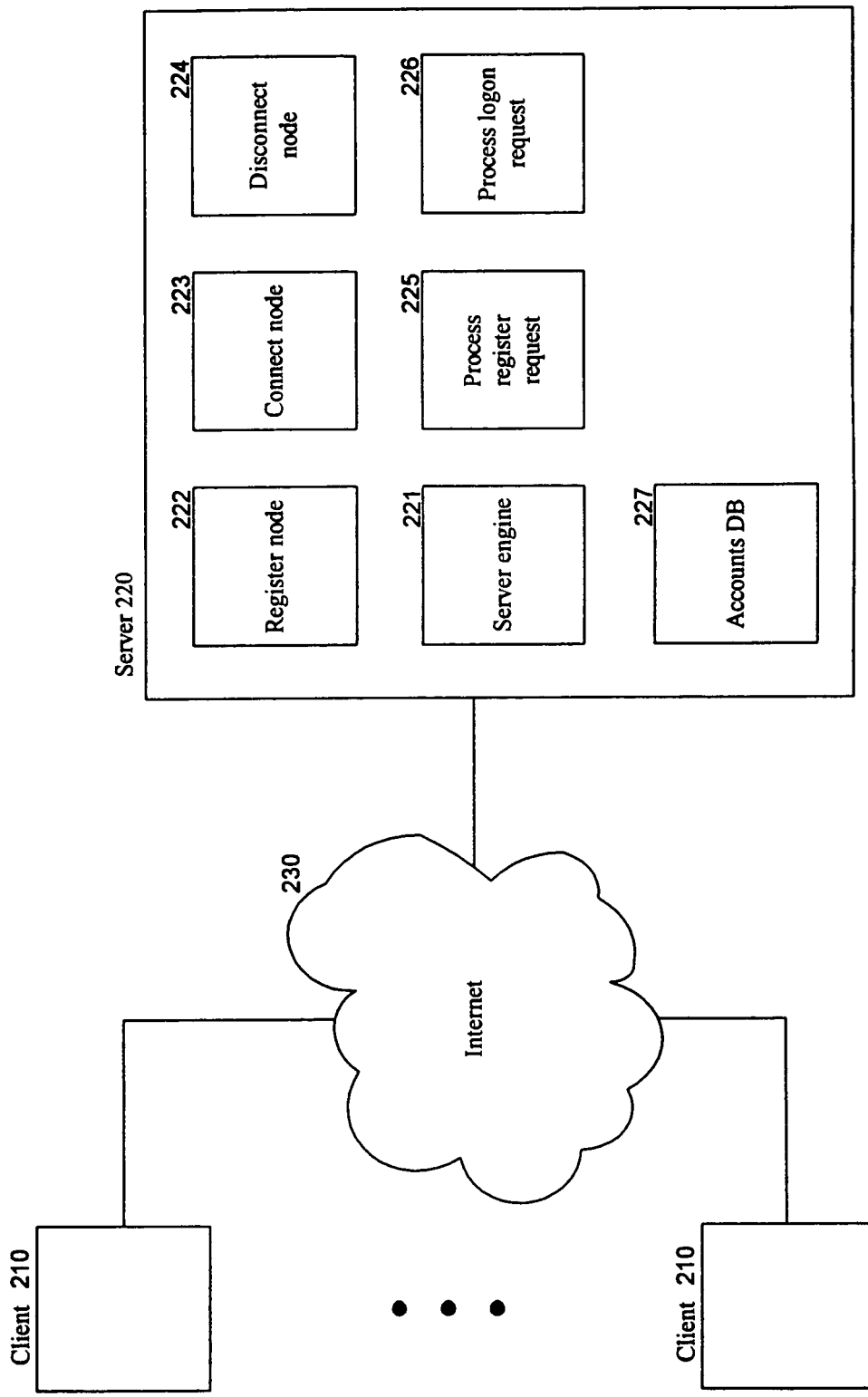
FIG. 2 is a block diagram illustrating the account management system in one embodiment.

A method and system for managing accounts that control access to resources of different providers is provided. In one embodiment, the account management system allows providers to use a common logon procedure through an account management server. The account management system dynamically creates accounts when users request to access resources. To access to a resource, a user provides their credentials (e.g., user identifier and password) through a certain location (e.g., client computer) and identifies the resource (e.g., application). The account management system determines whether an account has already been created for those credentials. If not, the account management system authenticates the user, creates a new account for those credentials (i.e., registration), and associates the identified resource with the account. If an account has already been created for those credentials, then the account management system associates the identified resource with that account. The account management system then notifies the provider that the user is authorized to access the resource. In this way, accounts are automatically created when a resource is accessed, and access to different resources using the same credentials automatically ties the resources to the same account. To access a different resource provided by a different provider, the user again provides their credentials and identifies the different resource. Since an account has already been created for those credentials, the account management system simply associates the different resource with the account if not already associated. Each provider can customize their logon procedures as long as the provider adheres to the procedures defined by the account management system for acceptable credentials. By customizing their logon procedures, a provider can use the account management system in such a way that their users are not even aware of the account management system. Because resources of two different providers are associated with a single account, the account management system can generate a single report (e.g., bills) for the user that reflects the user's access of both resources.

One aspect of the account management system provides a technique for identifying common accounts when a user provides different credentials for accessing different resources such as, for example, when the same user accesses one resource using one user identifier and then accesses another resource using another user identifier. In general, the account management system creates a separate account for each user, and the user may have multiple unique sets of credentials. The account management system associates accounts with nodes or locations. It tries to identify common accounts when a user accesses a resource from one node using credentials of an account associated with another node and the node from which the user is accessing the resource already has an account associated with it. When the account management system creates an account, it associates that account with the node (e.g., computer) through which the user has requested to access the resource. When the account management system receives a request from the user at that node to access a resource of another account associated with another node, it determines whether the account associated with the node and the account associated with the other node should be considered the same account. For example, a household may have two computers. One family member may have accessed a resource from one computer using their own identifier and another family member may have accessed another resource (or the same resource) from the other computer using their own identifier. The account management system would create two accounts and associate the accounts with the different computers. When one family member tries to access through the other computer a resource using their own identifier, the account management system detects that the account associated with the computer and the account associated with the other computer are possibly common accounts. The account management system may prompt the user to indicate whether the different user identifiers should really represent the same account. If so, then the account management system updates its records to reflect that the two user identifiers represent the same accounts. In such a case, the users will access each resource using their own user identifiers. Since the accessing of both resources is tied to a single account, information relating to such accessing (e.g., billings, notifications, and preferences) may be combined. The account management system similarly identifies common accounts when one user uses two different user identifiers. In an alternative embodiment, the account management system authorizes access to resources based on whether that pair of credentials has already been associated with that resource. If so, the account management system authorizes access to the resource. In this embodiment, the account management system may track combinations of credentials and resources. Thus, within one account, different sets of credentials (e.g., different user name and password) can be used to access different or even the same resource. To avoid user confusion, the account management system may, however, require each resource associated with an account to have only one authorized set of credentials, even though another resource of the account may be associated with a different set of credentials. Thus, the credentials of one family member cannot be used to access a resource of the common account when that resource is associated with the credentials of the other family member.

Another aspect of the account management system allows users to access their accounts from different nodes. When a user requests to access a resource using a node and the user's account is not currently associated with that node, then the account management system associates the account with that node. If the user specifies that access through the node is only on a temporary basis, for example, because the user is visiting that node, then all information relating to the access to the resource is removed from the node after access to the resource is complete. The use of a node on a temporary basis is commonly called "roaming."

FIGS. 1A-1C illustrate display pages provided by the account management system in one embodiment. FIG. 1A illustrates a display page for entry of the user identifier. This display page is typically displayed by the application as soon as it is started. Display page 100 includes a user identifier field 101 a password field 102, an existing user button 103, and a new user button 104. If the existing user button is selected, the account management system attempts to log the user on to the application using the user identifier and password. If the new user button is selected, then the account management system registers the user (if not already registered), sends a temporary password to the user, so that the user can log on as an existing user using the temporary password. The temporary password may be sent through a different communications channel, such as by electronic mail message or telephone. The use of a different communications channel known to be associated with that user helps ensure that an imposter is not using the user identifier. In one embodiment, user identifiers are the electronic mail addresses of the users. In this way, the account management system can send an electronic mail message to the address represented by the user identifier. FIG. 1B illustrates a display page through which a user can change their temporary password. Display page 110 includes a temporary password field 111, a new password field 112, a confirm password field 113, and continue button 114. After the user receives a temporary password, the user enters it into the temporary password field, enters a new password, and selects the continue button. Assuming that the temporary password entered by the user matches the temporary password generated by the account management system, then a new account is confirmed for the user identifier and access to the identified application is authorized. This confirmation process helps with the initial authentication of the user. FIG. 1C illustrates a display page for identifying common accounts. The account management system displays this display page when a user requests to access an application (i.e., a particular type of resource) of an account that is not already assigned to the requesting node and at least one account is already assigned to the requesting node. Display page 120 includes an account selection area 121 with radio buttons and a continue button 122. The account selection area indicates that two accounts are currently assigned to the requesting node. The accounts may be identified by the names of the users. The user indicates whether the account associated with the application to be accessed should be the same account as one of the displayed accounts. In one embodiment, the account management system may require the user to enter a password associated with the selected account to ensure that an imposter is not indicating that the accounts should be common.

FIG. 2 is a block diagram illustrating the account management system in one embodiment. Client computers 210 are connected to the server computer 220 via the Internet 230. The computers may include a central processing unit, memory, input devices (e.g., keyboard and pointing device), output devices (e.g., display devices), and storage devices (e.g., disk drives). The memory and storage devices are computer-readable media that may contain instructions that implement the account management system. In addition, the data structures and message structures may be stored or transmitted via a data transmission medium, such as a signal on a communications link. Various communication channels other than the Internet may be used, such as a local area network, a wide area network, or a point-to-point, dial-up connection. The server computer includes a server engine 221, a register node component 222, a connect node component 223, a disconnect node component 224, a process register request component (new user) 225, a process logon request component (existing user) 226, and an accounts database 227. The server engine receives requests from the client computers and invokes the appropriate component for processing the request. The register node component receives requests to register a client computer with the account management system. Each node registers with the account management system before access to a resource from that node is authorized. The connect node and disconnect node components control connecting client computer to the server computers. The process register request component is invoked to process a registration request from a new user that is received from a client computer. Registration refers to the process of assigning a new user identifier to a new account. The process logon request component controls the logon of an existing user. A log on refers to the process of authenticating the user to access an application, account, or resource. The accounts database includes various tables for managing the accounts.

FIG. 3 is a block diagram illustrating the tables of the accounts database in one embodiment. The accounts database includes a registered node table 301, an account table 302, an application table 303, a user table 304, and a registered connected node table 305. The registered node table contains an entry for each registered node and indicates the accounts associated with that node. For example, the first entry of the registered node table indicates that the node with the node identifier "Home" is associated with account "A1" and account "A2." This association means that all applications associated with both accounts can be accessed from that node. The account table contains an entry for each account and indicates the applications associated with that account. For example, the first entry of the account table indicates that applications "O1," "O2," and "O3" are associated with account "A1." This association means that access to these three applications are tied to a common account. The account table may also indicate the credentials associated with each application of each account. By providing credentials for each application, users of a common account can have their access to the applications limited to those who know the credentials associated with that application. The application table contains an entry for each application that is available to be accessed by a user and may include a reference indicating where the application is stored. The user table contains an entry for each user (or more precisely each user identifier) and includes the password and the associated account. For example, the first entry of the user table indicates that user "U1" is associated with account "A1." The associations in these tables means that user "U1" can access the applications of account "A1" through nodes "Home" and "Work1." The connected node table contains an entry for each node currently connected to the server computer. For example, the first entry indicates that node "Home" is currently connected to the server computer.

Initially, the node table, account table, and user table are empty; and the application table contains an entry for each available application (e.g., applications "O1," "O2," "O3," and "O4"). When user "U1" requests to access application "O1," the account management system first adds an entry to the registered node table for node "Home" with no associated account to effect registration of the node. The account management system then adds an entry to the account table for account "A1" that indicates the association with application "O1," adds an entry to the user table for user "U1" that indicates the association with account "A1," and updates the entry for the registered node table for node "Home" to associate it with account "A1" to effect the registration of the user. User "U1" may then request to access application "O2" from node "Home." In response, the account management system notes that an entry for user "U1" is already in the user table, that the user is associated with account "A1," and that the entry in the registered node table for node "Home" is already associated with account "A1." The account management system then updates the entry in the account table for account "A1" to associate it with application "O2." User "U1" then tries to access application "O3" from node "Work1." Since the node "Work1" is not yet registered, the account management system adds an entry to the registered node table for node "Work1" without any association to an account. The account management system determines that the user table contains an entry for user "U1" and that the user is associated with account "A1." The account management system then updates the entry in the registered node table for node "Work1" to associate it with account "A1" and updates the entry in the account table for account "A1" to associate it with application "O3."User "U1" can then access applications "O1," "O2," and "O3" from the nodes "Home" and "Work1." User "U2" then requests to access application "O1" from node "Home." Since user "U2" is new, the account management system adds an entry to the account table for a new account "A2" associated with application "O1," adds an entry to the user table for user "U2" associated with account "A2," and updates the entry in the registered node table for node "Home" to associate it with account "A2" to effect the registration of the user. The person who used user identifier "U2" then requests to access application "O4" from node "Work2" using user identifier "U2'." Since "U2" and "U2'" are not the same user identifiers, the account management system assumes the users are different. The account management system first adds an entry to the registered node table for node "Work2" without being associated to any account. The account management system then adds an entry to the account table for account "A3" and associates it with application "O4," adds an entry to the user table for user "U2'" to associate it with account "A3," and updates the entry in the registered node table for node "Work2" to associate it with account "A3." If the user then tries to access application "O1" from node "Work2" using user identifier "U2'," the account management system prompts the user to indicate whether account "A2" and account "A3" are common accounts. If the user responds affirmatively, then the account management system (not shown in the tables) updates the entry in the user table for user "U2'" to associate it with account "A2" and disassociate it from account "A3," updates the entry in the account table for account "A2" to associate it with application "O4," and updates the entry in the register node table for node "Work2" to associate it with account "A2" rather than account "A3." The account management system then deletes the entry in the account table for account "A3."

Figure 4:
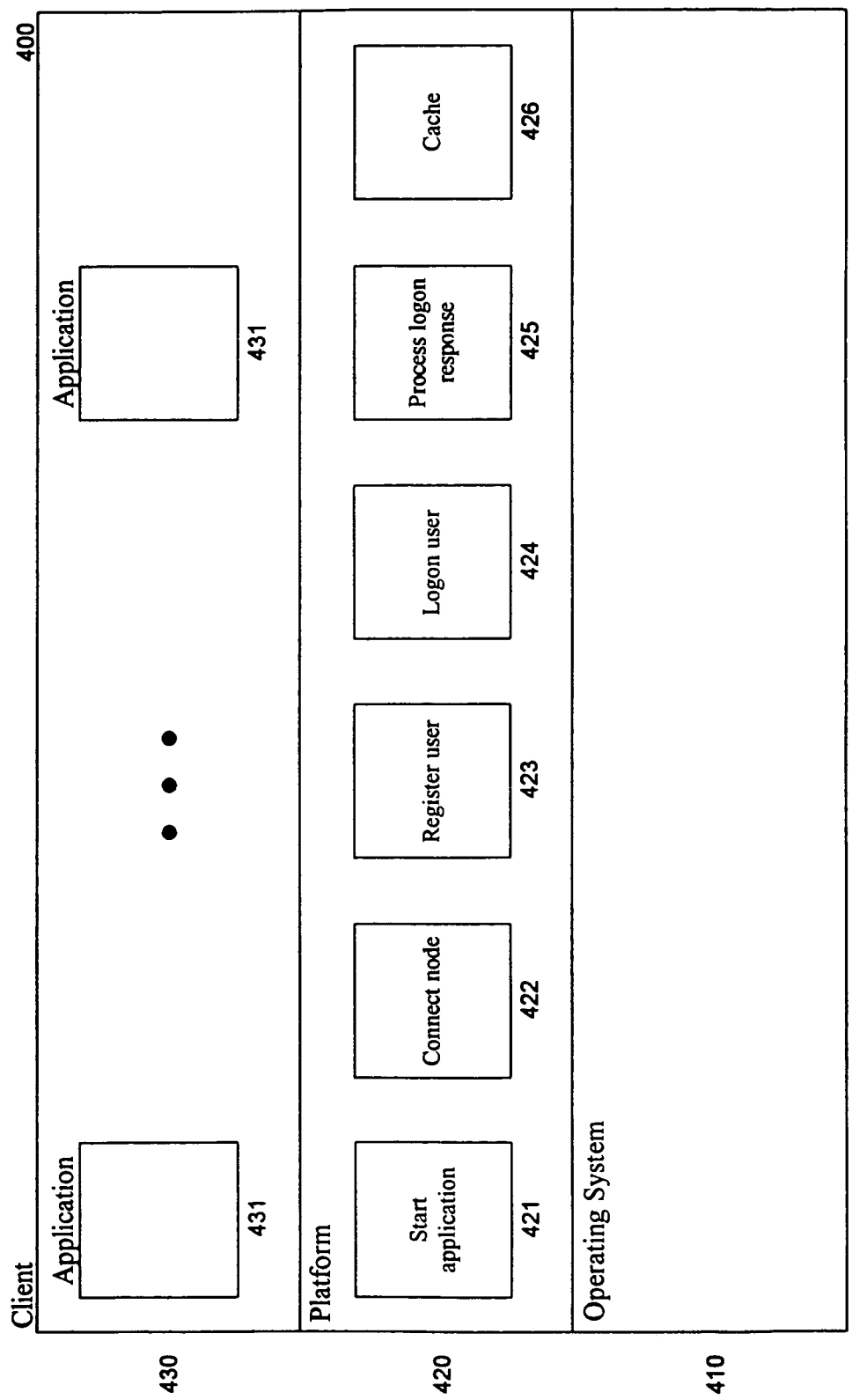
FIG. 4 is a block diagram illustrating components of a client computer in one embodiment.

FIG. 4 is a block diagram illustrating components of a client computer in one embodiment. The client computer includes an operating system 410, application platform 420 and application storage area 430. The application platform includes the client-side portion of the account management system that includes a start application component 421, a connect node component 422, a register user component 423, a logon user component 424, a process logon response component 425, and a cache 426. The start application component is invoked when a user indicates to start an application. The connect node component is invoked to connect the client computer to the server computer and register the client computer with the account management system if not already registered. The register user component is invoked to register a user with the account management system, and the logon user component is invoked to logon a registered user to an application. The process logon response component is invoked when the client computer receives a response from the server computer to a logon request. The cache may contain a copy of portions of the account database relating to that client computer. The caching of this data allows the client computer to authorize access to applications of accounts that are associated with the client computer when the server computer is unavailable.

Figure 5:
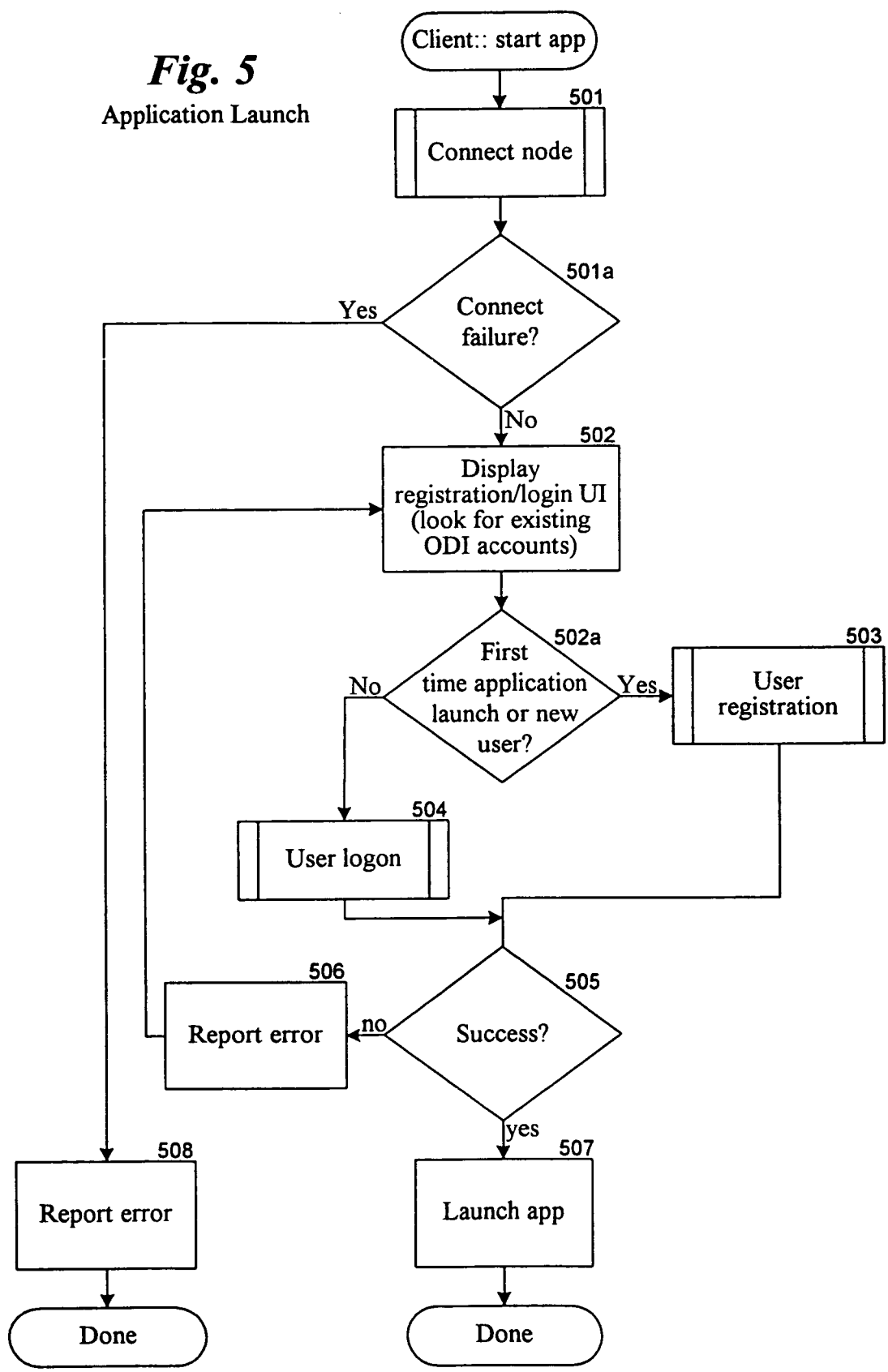
FIG. 5 is a flow diagram illustrating the processing of the start application component of a client computer.

FIGS. 5-14 are flow diagrams illustrating the processing of the account management system in one embodiment. FIGS. 5-9 are flow diagrams of components of a client computer. FIG. 5 is a flow diagram illustrating the processing of the start application component of a client computer. This component connects the client computer to the server computer and logs the user on to the application identified by the user. This component is invoked by an application that the user has launched. In block 501, the component connects the client computer to the server computer by invoking the connect node component. As part of the connection process, if the client computer is unregistered, it is registered with the server computer. In decision block 501a, if the connection failed, then the component reports an error in block 508 and completes, else the component continues at block 502. In block 502, the component inputs an indication of whether the user is a new user or an existing user. If the user already exists, then the component inputs the user identifier and password. In decision block 502a, if this is the first time any application that uses the account management system is being launched at the client computer (then the client computer has no information about any user) or the user indicated that they were new, then the component continues at block 503, else the component continues at block 504. In block 503, the component registers the new user by invoking the register user component, which also logs the user onto the application. In block 504, the component logs the user on to the application by invoking the logon user component. In decision block 505, if the user was successfully logged on, then the component continues at block 507, else the component reports an error to the user in block 506 and loops to block 502 to begin attempting to log the user on to the application. In block 507, the component launches the application program and then completes.

Figure 6:
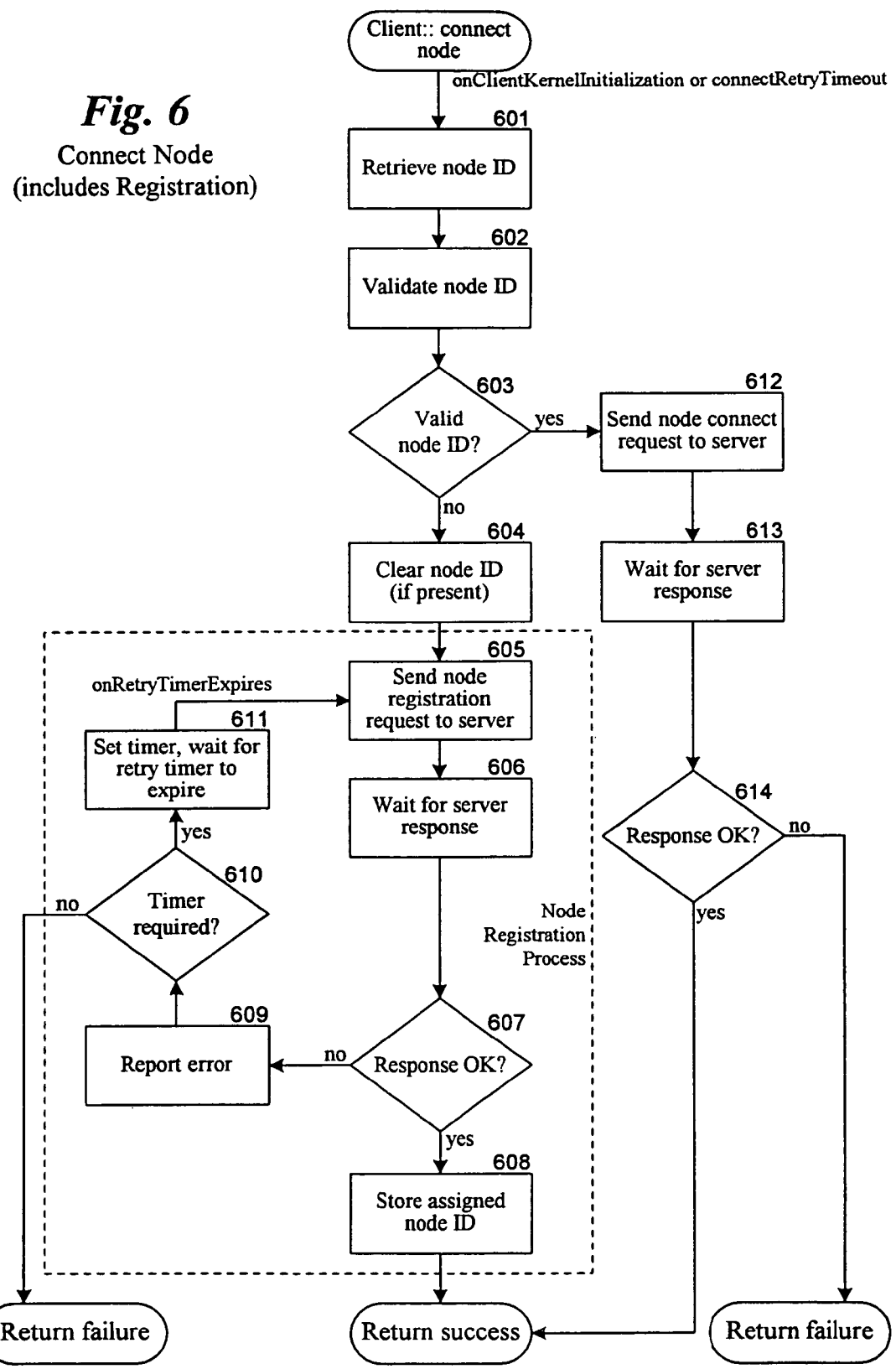
FIG. 6 is a flow diagram of the connect node component of the client computer.

FIG. 6 is a flow diagram of the connect node component of the client computer. This component determines whether the computer is registered with the account management system. If not, the component effects the registration of the client computer with the account management system. The component then connects the client computer to the server computer. The registration process automatically connects the client computer to the server computer. In block 601, the component retrieves a node identifier that was stored if and when the client computer was registered with the account management system. The registration of a node may be handled by a node management system that is separate from the account management system. The node identifier may be stored in a registry provided by the operating system. In block 602, the component validates the node identifier. In decision block 603, if the node identifier is valid, then the component continues at block 612, else the component continues at block 604. In block 604, the component clears the current node identifier. In blocks 605-611, the component registers the client computer with the account management system or a node management system. In block 605, the component sends a register node request to the server computer. In block 606, the component receives the response, including the node identifier, from the server computer. In block decision 607, if the response indicates success, then the component continues at block 608, else the component continues at block 609. In block 608, the component stores the received node identifier so that it is available in block 601 when the component is next invoked and then returns an indication of success. In block 609, the component reports that the node could not be registered to the user. In decision block 610, the component determines whether the registration should be retrieved after a certain period. If so, the component continues at block 611, else the component returns an indication of failure. In block 611, the component sets a timer (or uses some other delaying mechanism) and when the timer expires the component continues at block 605 to retry the registration. In block 612, the component sends a connection request to the server computer. The connection request includes the node identifier and node address. In block 613, the component waits for a response from the server. In decision block 614, if the response indicates a successful connection, then the component returns an indication of success, else the component returns an indication of failure.

Figure 7:
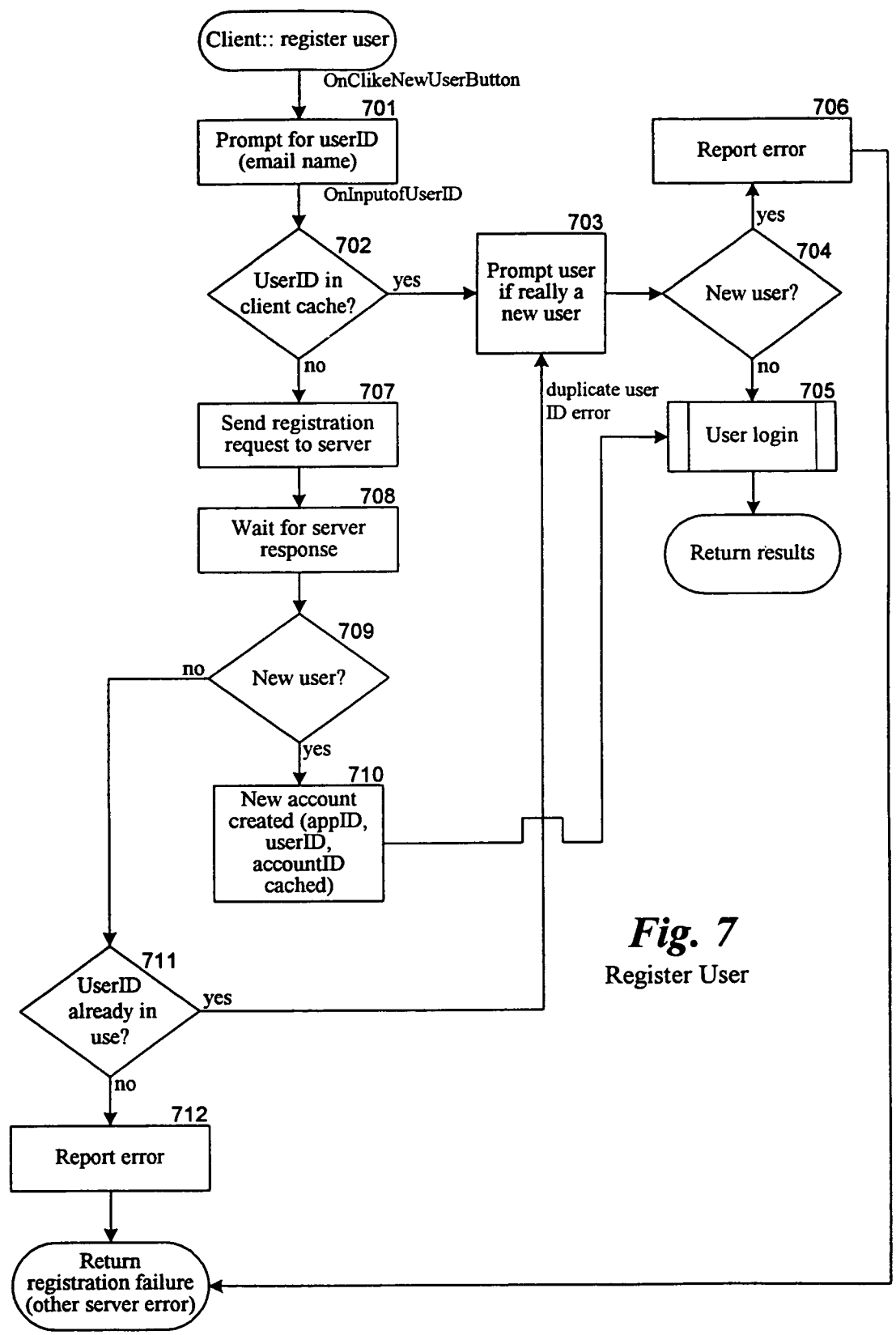
FIG. 7 is a flow diagram illustrating the processing of the register user component of the client computer.

FIG. 7 is a flow diagram illustrating the processing of the register user component of the client computer. The register user component coordinates the registration of a user that is new to the client computer. If the client computer has already encountered the user identifier, then the component prompts the user to see if the user is really the same user. If the same, then the component proceeds to log the user on to the application, else the component returns an error. If the user identifier is new to the client computer, then component registers the user with the server computer and receives the account identifier in return and proceeds to log the user on to the application. In block 701, the component inputs the user identifier that was received through the display of FIG. 1A. The component may also input some additional registration information such as the name of the user and billing information. In decision block 702, if the user identifier is in the cache of the client computer, then the user identifier is not new and the component continues at block 703, else the component continues at block 707. In block 703, the component asks the user if the user is really the same user who used this user identifier for another application. In decision block 704, if the user indicates that they are not the same, then the component reports an error to the user in block 706 because of duplicate user identifiers and then return an error, else the component continues at block 705. In block 705, the component invokes the logon user component to log the user on to the application and then returns the results of the logon. Blocks 707-712 are performed when the user identifier is indeed new to the client computer. In block 707, the component sends a registration request to the server computer to register the user. The request includes the application identifier, user identifier and node identifier, but does not include an account identifier because none is known for this user. In block 708, the component waits for a response to the registration request from the server computer. In decision block 709, if the response indicates that the registration of the new user was successful, then the response includes the account identifier and the component continues at block 710, else the component continues at block 711. In block 710, the component caches the new account identifier, user identifier, and application identifier and continues at block 705 to log the user onto the application. In decision block 711, if the user identifier is already in use, then the component continues at block 703 to see if the user is really the same, else the component continues at block 712 to report some other error and then returns an indication of failure.

Figure 8:
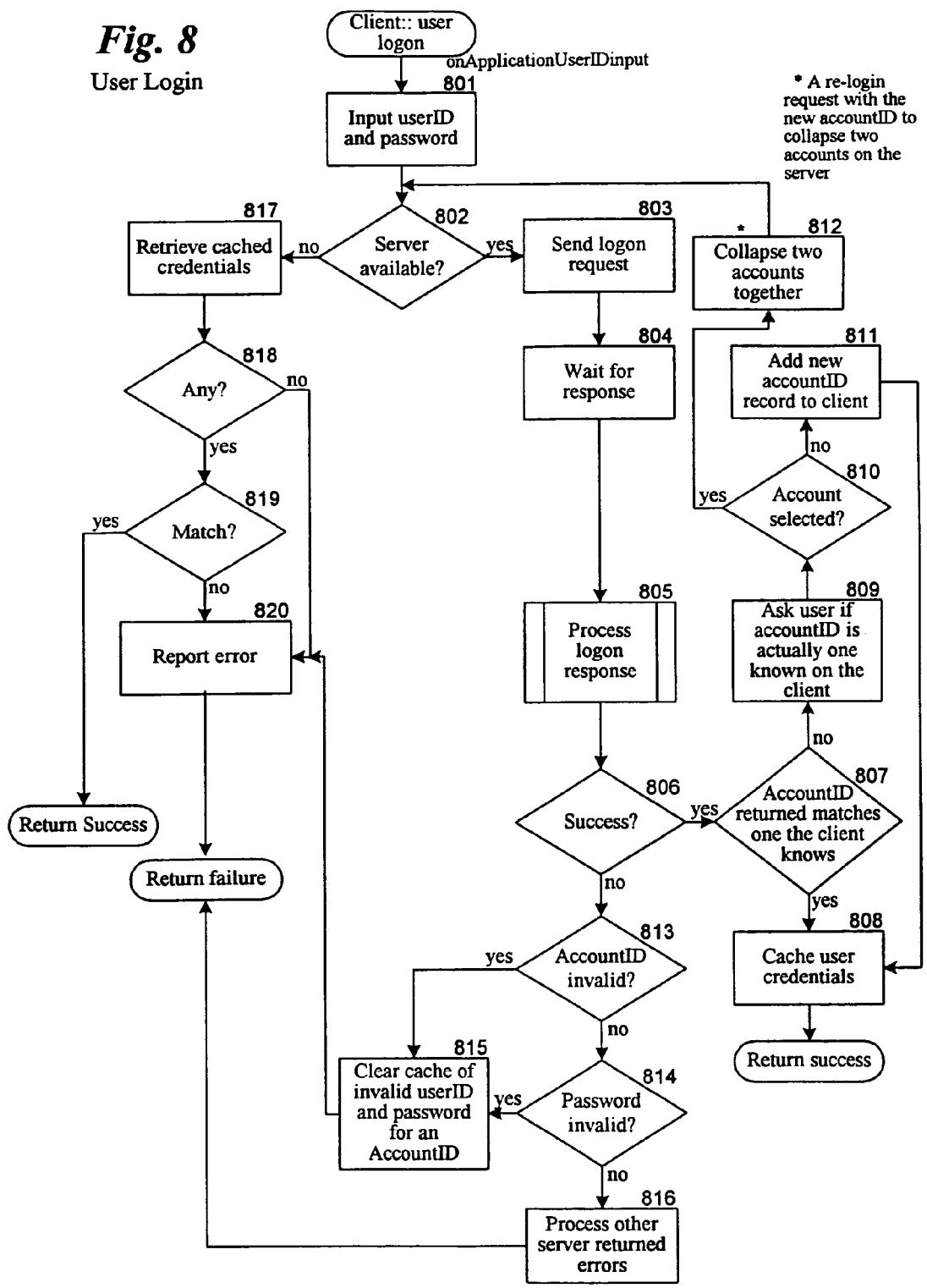
FIG. 8 is a flow diagram illustrating the processing of the logon user component in one embodiment.

FIG. 8 is a flow diagram illustrating the processing of the logon user component. The component coordinates the logon of a user to the application. This component is invoked after a new user has been successfully registered or a user has indicated that they are an existing user. If the user is not registered, then the component returns an error. If the user is known to the client computer, then the component sends the account identifier with the logon request to the server computer. If the user is not known to the client computer, the component sends the logon request without the account identifier. If the server computer successfully log the user on to the application, the server computer returns the account identifier. If the account identifier matches an account known to the client computer, then the component caches the user's credentials, else the component combines accounts at the user's request. The user may choose to combine accounts or start using an account that is new to the node. If the logon is not successful, then the component clears its cache of the user identifier password for the account. This component is invoked when a user requests to access an application that has already been accessed from the client computer or when a new application is being accessed using a user identifier that has already been used at the client computer. In block 801, the component inputs a user identifier and password. In decision block 802, if the server computer is available, then the component continues at block 803, else the component continues at block 817. In blocks 803-816, the component requests the server computer to log the user onto the application. In block 803, the component sends a logon request to the server computer. The logon request includes the node identifier, application identifier, user identifier, and password. This logon request does not include an account identifier that may have been cached by the client computer. In block 804, the component waits for the response from the server computer for that user identifier. For example, if a user identifier is being used that has not been used before at the client computer, then the logon request does not include an account identifier. The response includes the account identifier associated with the user identifier. In block 805, the component processes the logon response by invoking the process logon response component. In decision block 806, if the logon was successful, then the component continues at block 807, else the component continues at block 813. In decision block 807, if the account identifier returned in the response matches an account identifier known to the client computer, then the component continues at block 808, else the component continues at block 809. In block 808, the component caches the user credentials (user identifier and password) in association with the account identifier and then returns an indication of a success. In block 809, the component asked the user if the returned account is actually one of the accounts that is known to the client computer by displaying the display page of FIG. 1C. In decision block 810, if the user selected a known account, then the component continues at block 812, else the component continues at block 811. In block 811, the component caches the new account identifier and continues at block 808. In block 812, the component collapses the returned account and the user selected account into a single account and continues at block 802 to send a re-login request with the user selected account to the server computer to collapse the two accounts. The server computer will detect that the user identifier is now being associated with the user selected account and is different from the returned account and will collapse the two accounts into a common account identified by the user selected account. In decision block 813, if no account identifier is returned in the response, then the user has not yet been registered or the user's registration has been canceled and component continues at block 815, else the component continues at block 814. In decision block 814, if the password sent in the logon request was invalid, then the component continues at block 815, else the component continues at block 816. In a block 815, the component clears the cache of the invalid user identifier and password for the account and continues at block 820 to report an error. In block 816, the component processes the error reported by the server computer and then returns a failure indication. In blocks 817-820, the component attempts to locally authorize access (log on the user) to the identified application. In block 817, the component retrieves the cached credentials for the user identifier and application identifier. In decision block 818, if the cached credentials were found, then the component continues at block 819, else the component continues at block 820 to report an error. In decision block 819, if the input password matches the cached password of the credentials, then the component returns an indication of success, else the component continues at block 820. In block 820, the component reports an error to the user and returns an indication of failure.

Figure 9:
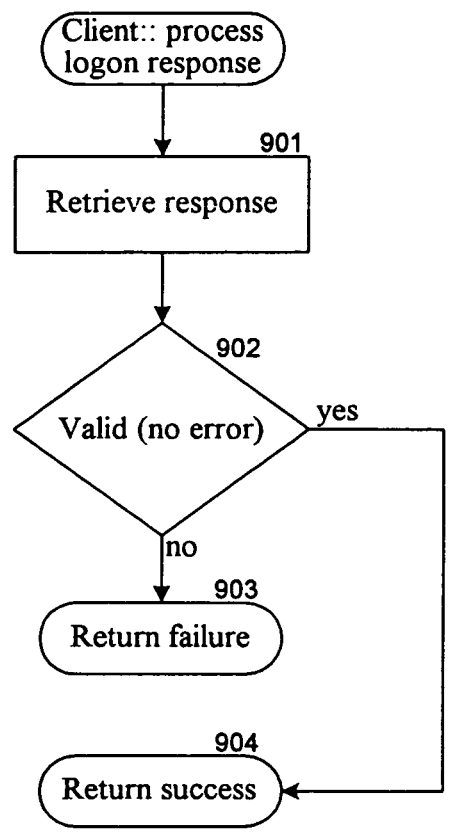
FIG. 9 is a flow diagram illustrating the processing of the process logon response component of the client computer.

FIG. 9 is a flow diagram illustrating the processing of the process logon response component of the client computer. This component is invoked when a response to a logon request is received from the server computer. In block 901, the component retrieves the response. In decision block 902, the component determines whether the response indicates that the logon was successful. A logon request can be unsuccessful if the account identifier sent in the request is invalid, the password sent in the request was invalid, or other server computer errors occurred. If the logon was successful, then the component returns an indication of success, else the component returns an indication of failure.

Figure 10:
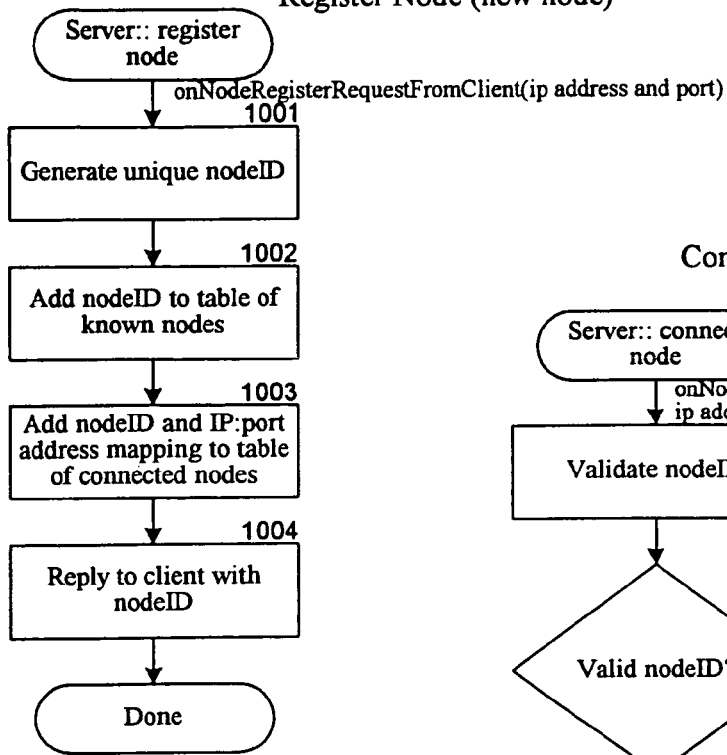
FIG. 10 is a flow diagram of the processing of the register node component of the server computer.

FIGS. 10-14 are flow diagrams of components of the server computer. FIG. 10 is a flow diagram of the processing of the register node component of the server computer. This component is invoked when the server computer receives a request from a client computer to register a node. The component also connects the client computer to the server computer. In block 1001, the component generates a unique node identifier. In block 1002, the component adds the node identifier to the registered node table to register the client computer. In block 1003, the component adds the node identifier and the node address (e.g., IP address and port address) to the connected node table to connect the client computer to the server computer. In block 1004, the component sends a response to the client computer that includes the node identifier. The component then completes.

Figure 11:
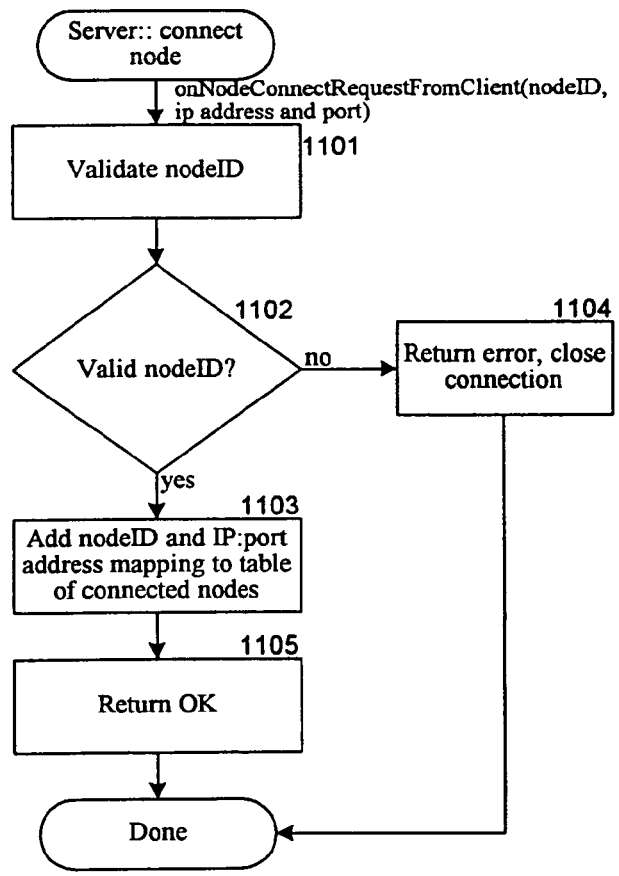
FIG. 11 is a flow diagram of the processing of the connect node component of the server computer.

FIG. 11 is a flow diagram of the processing of the connect node component of the server computer. This component is invoked when the server computer receives a request to connect a client computer. The connect request includes the node identifier of the client computer and the node address. In block 1101, the component validates the node identifier by comparing it to the entries in the registered node table. In decision block 1102, if the node identifier is in the registered node table, then the component continues at block 1103, else the component continues at block 1104. In block 1103, the component adds an entry for the node identifier and node address pair to the connected node table and then returns an indication of success. In block 1104, the component sends an error message to the client computer and closes the connection and completes.

Figure 12:
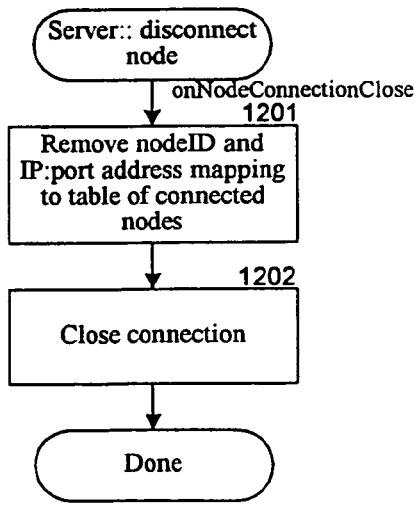
FIG. 12 is a flow diagram of the processing of the disconnect node component of the server computer.

FIG. 12 is a flow diagram of the processing of the disconnect node component of the server computer. This component is invoked when the server computer receives a connection close request from a client computer. In block 1201, the component removes the entry for the node identifier and node address pair from the connected node table. In block 1202, the component closes the connection with the client computer, logs the closing and then completes.

Figure 13:
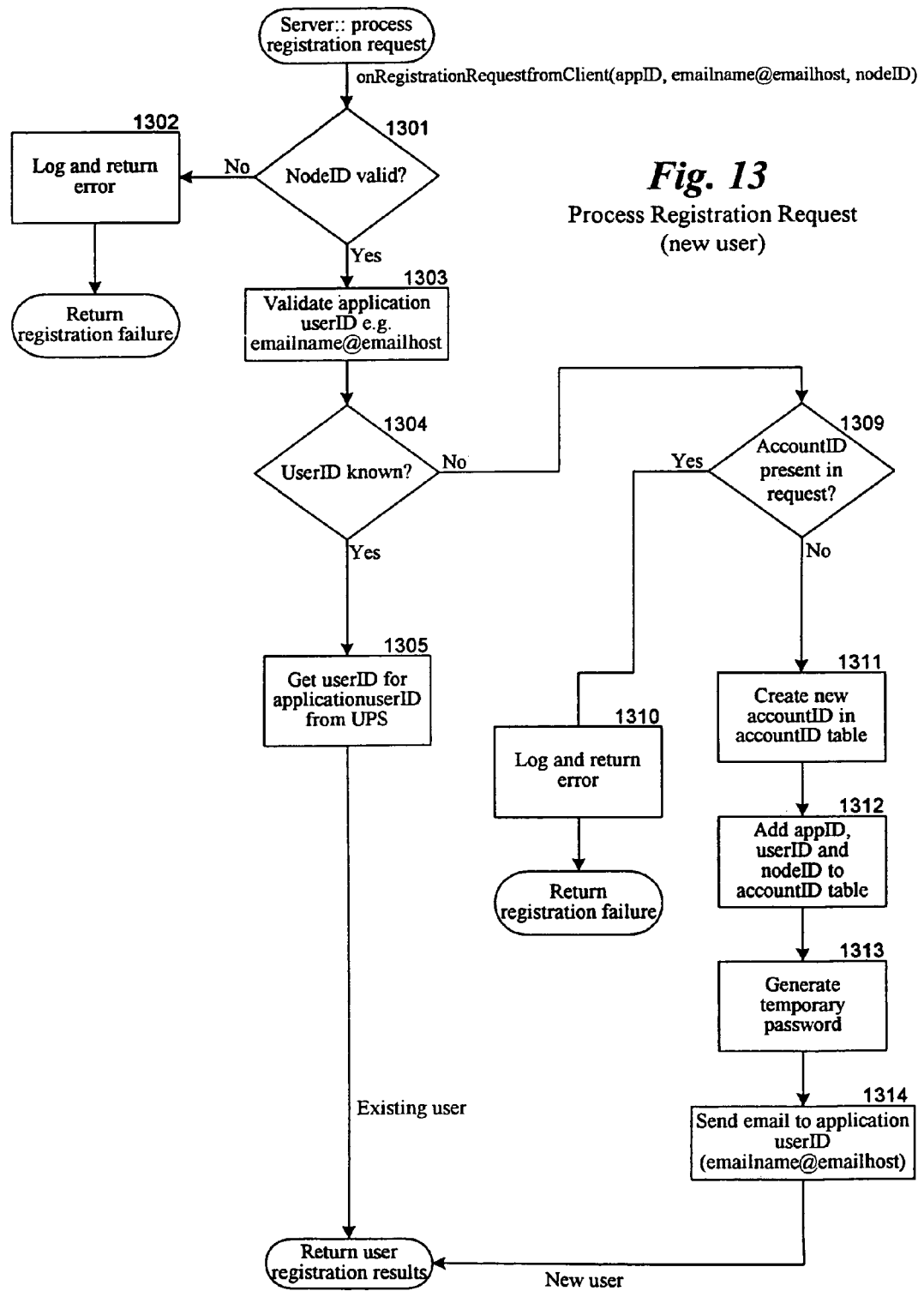
FIG. 13 is a flow diagram of the processing of the register user component of the server computer.

FIG. 13 is a flow diagram of the processing of the register user component of the server computer. This component is invoked when the server computer receives a request to register a new user from a client computer. The request includes the user identifier and node identifier. If the user identifier is already registered, then the component sends a response that indicates the account number and that the user identifier is already in use. If the user identifiers is not registered, then the component effects registration and sends a temporary password to the user via e-mail. In decision block 1301, if the received node identifier is in the connected node identifier table, then the client computer is connected and the component continues at block 1303, else the component sends an error response in block 1302 and then completes. In block 1303, the component determines whether the user identifier is in the user identifier table. In block 1304, if an entry for the received the user identifier is in the user identifier table, then the user identifier is known to the server computer and the component continues at block 1305, else the component continues at block 1309. In block 1305, the component retrieves the account identifier for the user identifier from the account table. The component then sends a response to indicate that the user identifier is already registered and then completes. In decision block 1309, if the account identifier is present in the received request, then the component continues at block 1310, else the component continues at block 1311. In block 1310, the user identifier is new but the account identifier was included in the registration request. As a result, the component sends a response to the client computer indicating a registration failure, which causes the client to ask the user to logon and then completes. In block 1311, the component creates a new account identifier in the account table. In block 1312, the component adds the application identifier, user identifier, and node identifier to the account table. In block 1313, the component generates a temporary password. In block 1314, the component sends an electronic mail message into the user indicating the temporary password. The component then completes.

Figure 14:
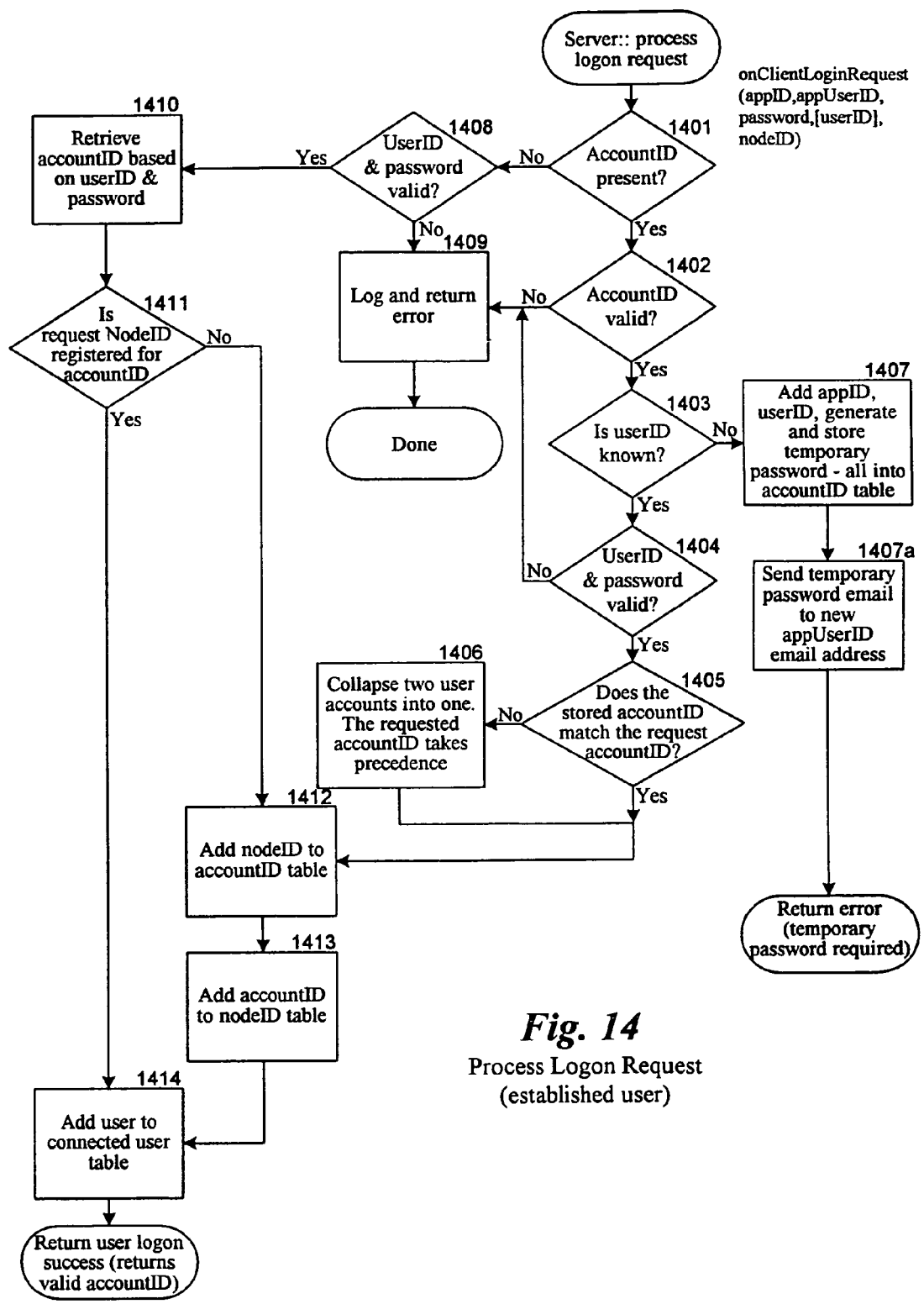
FIG. 14 is a flow diagram of the processing of the process logon request component of the server computer.

FIG. 14 is a flow diagram of the processing of the process logon request component of the server computer. This component is invoked when the server computer receives a logon request from a client computer. The logon request includes the application identifier, user identifier, password, node identifier, and optionally account identifier. If the account identifier is included in the request and is valid but it does not match the account identifier that the server computer has associated with the user identifier, then the server computer collapses the two accounts into a single account that is identified by the received account identifier. The account identifier is not included when that user identifier has not been previously used at the client computer. In decision block 1401, if the account identifier is present, then the component continues at block 1402, else the component continues at block 1408. In decision block 1402, if the account table contains an entry for the received account identifier, then the account identifier is valid and the component continues at block 1403, else the component continues at block 1409 to report an error. In block 1403, if the user table contains an entry for the received user identifier, then the user identifier is valid and the component continues at block 1404, else the component continues at block 1407. In decision block 1404, if the password for the user identifier is valid, then the component continues at block 1405, else the component continues at block 1409 to report an error. In decision block 1405, if the account identifier associated with the user identifier matches the received account identifier, then the component continues at block 1412, else the component continues at block 1406. In block 1406, the component collapses the two accounts into a common account identified by the received account identifier and continues at block 1412. In block 1407, the component adds an entry to the account table that maps the application identifier and user identifier to the account identifier, and an entry to the user table that maps the user identifier to the temporary password. In block 1407a, the component sends the temporary password to the user via electronic mail and sends a response indicating failure to the client computer and then completes. Blocks 1408-1414 are performed when no account identifier is included in the response. In decision block 1408, if the password is valid for the user identifier, then the component continues at block 1410, else the component continues at block 1409. In block 1409, the component sends an error response to the server computer and then completes. In block 1410, the component retrieves from the user table the account identifier associated with the user identifier. In decision block 1411, if the node identifier in the request is associated with the retrieved account identifier, then the component continues at block 1414, else the component continues at block 1412. In block 1412, the component adds an entry to the account table that maps of the account identifier to the node identifier. In block 1413, the component adds an entry to the node table that maps the node identifier to the account identifier and then continues at block 1413. In block 1414, the component adds the application identifier to the entry for account in the account table and then sends a response to the client computer that includes the account identifier and then completes.

From the above description, it will be appreciated that although specific embodiments of the technology have been described for purposes of illustration, various modifications may be made without deviating from the spirit and scope of the invention. In one embodiment, credentials other than user identifier and password pairs can be used. For example, each user may encrypt certain information with their private key of a public and private key pair. The server computer can use the public key to decrypt the information to ensure that it was encrypted with the correct private key. Also, the authentication can be performed by a separate authentication server with the results being sent back to the server computer or directly to the client computers. In another embodiment, each account can be identified by the user identifiers that are assigned to that account. Thus, an account may be considered a group of one or more user identifiers. Also, the resources need not be limited to computer resources. For example, the resources may include people, groups or communities, physical goods, communications service (e.g., phone, video), and so on. Accordingly, the claims are not limited except by the appended claims.

The invention claimed is:

1. A computer-based method performed by one or more computers programmed to identify common accounts, the method comprising:
assigning by one of the one or more computers a first user identifier to a first account, the first account being associated with a first node, the first node including a first computing device;
assigning by one of the one or more computers a second user identifier to a second account, the second account being associated with a second node, the second node including a second computing device;
receiving a request from the second node that includes the first user identifier;
determining whether the first account is already associated with the second node; and
upon determining that the first account is not already associated to the second node,
determining whether the first and second accounts represent the same account; and
when it is determined that the first and second accounts represent the same account, combining by one of the one or more computers the first and second accounts into a single account.

2. The method of claim 1 wherein the determining includes requesting a user to indicate whether the first and second accounts represent the same account.

3. The method of claim 2 including identifying the second account to the user by specifying a user name associated with the second account.

4. The method of claim 2 wherein when the user indicates that the first and second accounts represent the same account, requesting that the user provide credentials associated with the second account.

5. The method of claim 1 wherein each account has a user and the user of the first account is the same as the user of the second account.

6. The method of claim 1 wherein each account has a user and the user of the first account is not the same as the user of the second account.

7. A method of claim 1 wherein the combining includes deleting one of the accounts and assigning the user identifier assigned to the deleted account to the remaining account.

8. The method of claim 7 including associating with the remaining account a resource that was associated with the deleted account.

9. The method of claim 1 including:
when it is determined that the first and second accounts do not represent the same account, associating the first account with the second node.

10. A computer-readable storage medium that is not a transitory, propagating signal containing computer-executable instructions for controlling an account management system of one or more computing devices to identify common accounts, by a method comprising:
receiving from a first user via a first client computer a request to access a first application, the request including first credentials of the first user;
determining whether a first account has been created for the first credentials;
when it has been determined that a first account has not been created for the first credentials,
creating a first account for the first credentials; and
associating the first client computer with the first account;
associating the first application with the first account;
receiving from a second user via a second client computer a request to access a second application, the request including second credentials of the second user;
determining whether a second account has been created for the second credentials;
when it has been determined that a second account has not been created for the second credentials,
creating a second account for the second credentials; and
associating the second client computer with the second account;
associating the second application with the second account;
receiving from the first user via the second client computer a request to access the first application;
determining whether the second client computer is already associated with an account;
when it is determined that the second client computer is already associated with the second account,
prompting the first user as to whether the first account and the second account should represent the same account for billing purposes; and
when the first user indicates in response to the prompt that the first account and the second account should represent the same account, combining the first account and the second account into a combined account that is accessible via the first credentials and the second credentials, associated with the first client computer and the second client computer, and associated with the first application and the second application wherein the first application is only accessible when a request to access the first application includes the first credentials and the second application is only accessible when a request to access the second application includes the second credentials.

11. The computer-readable storage medium of claim 10 further comprising when the first user providing the first credentials requests to access the first application, notifying a provider of the first application that the first user is authorized to access the first application.

12. The computer-readable storage medium of claim 10 further comprising when the first user indicates in response to the prompt that access via the second client computer is temporary, removing from the second client computer all information relating to access of the first application upon completion of accessing of the first application.

13. The computer-readable storage medium of claim 10 further comprising providing a bill for the combined account based on billings resulting from access of the first application and access of the second application.

14. One or more computing devices implementing an account management system that identifies common accounts, each computing device having a processor and a memory, comprising:
a component that establishes accounts for user credentials, wherein a first account is established for first user credentials of a first user and is associated with a first client computer and a first resource and wherein a second account is established for second user credentials of a second user and is associated with a second client computer and a second resource;
a component that receives from the first user via the second client computer a request to access the first account;
a component that
determines whether the second client computer is already associated with an account; and
when it is determined that the second client computer is already associated with the second account, determines whether the first account and the second account should represent the same account; and when it is determined that the first account and the second account should represent the same account, combines the first account and the second account into a combined account that is accessible via the first credentials and the second credentials, associated with the first client computer and the second client computer, and associated with the first resource and the second resource wherein the components are implemented as computer-executable instructions stored in memory for execution by a processor.

15. The one or more computing devices of claim 14 wherein after the first account and the second account are combined, the first resource is only accessible when a request to access the first resource includes the first credentials and the second resource is only accessible when a request to access the second resource includes the second credentials.

16. The one or more computing devices of claim 14 wherein the resources are applications.

17. The one or more computing devices of claim 14 further comprising a component that, when the first user providing the first credentials requests to access the first resource, notifies a provider of the first resource that the first user is authorized to access the first resource.

18. The one or more computing devices of claim 14 further comprising a component that, when the first user indicates access to the first resource via the second client computer is temporary, removes from the second client computer all information relating to access of the first resource upon completion of access of the first resource.

19. The one or more computing devices of claim 14 further comprising a component that provides a bill for the combined account based on billings resulting from access of the first resource and access of the second resource.

20. A computer-based method performed by one or more computers with at least one processor executing computer-executable instructions for identifying common accounts, the method comprising:

creating by a computer a first account having a first user identifier;

associating by a computer with the first account a first node that includes a first computing device;

creating by a computer a second account having a second user identifier;

associating by a computer with the second account a second node that includes a second computing device;

receiving by a computer from the second node a request to access a resource, the request including the first user identifier; and after receiving the request, determining by a computer whether the first account is already associated with the second node and whether the first and second accounts represent the same account;

combining by a computer the first and second accounts into a single account based on determining that the first account is not already associated with the second node and determining that the first and second accounts represent the same account so that the combined account has both the first user identifier and the second user identifier and is associated with both the first node and the second node; and maintaining by a computer the first and second accounts as separate accounts based on determining that the first account is already associated with the second node or determining that the first and second accounts do not represent the same account.

21. One or more computers programmed to identify common accounts, comprising:

a memory storing computer-executable instructions of a component that provides access to account information, the account information indicating that a first account having a first user identifier is associated with a first node and that a second account having a second user identifier is associated with a second node, the first node including a first computing device and the second node including a second computing device;

a component that receives from the second node a request to access a resource, the request including the first user identifier; and a component that, after receiving the request, determines whether the first account is associated with the second node and whether the first and second accounts represent the same account;

combines the first and second accounts into a single account based on determining that the first account is not associated with the second node and determining that the first and second accounts represent the same account so that the combined account has both the first user identifier and the second user identifier and is associated with both the first node and the second node; and maintains the first and second accounts as separate accounts based on determining that the first account is associated with the second node or determining that the first and second accounts do not represent the same account; and a processor for executing the computer-executable instructions stored in the memory.

22. The one or more computers of claim 21 wherein the account information indicates that the first account is associated with a first application and that the second account is associated with a second application and wherein the combined single account is associated with both the first application and the second application.

23. The one or more computers of claim 22 wherein the second application is not accessible when a request including the first user identifier is received.

24. The one or more computers of claim 22 wherein when the first and second accounts are combined, a combined bill is provided for the combined account based on billings resulting from access of the first application and access of the second application.

25. The one or more computers of claim 21 including:

a component that when a user provides the first user identifier via the first node and no account has been created for that first user identifier, creates the first account; and when a user provides the second user identifier via the second node and no account has been created for that second user identifier, creates the second account.

* * * * *